United States Patent Office.

JACOB ALTHOUSE, OF CROSS ROADS, PENNSYLVANIA, ASSIGNOR TO HIMSELF AND JOSEPH V. WINEMILLER.

*Letters Patent No. 77,860, dated May 12, 1868.*

IMPROVED FERTILIZER.

*The Schedule referred to in these Letters Patent and making part of the same.*

TO ALL WHOM IT MAY CONCERN:

Be it known that I, JACOB ALTHOUSE, of Cross Roads, York county, State of Pennsylvania, have invented an Improved Lime Phosphate or Fertilizer; and I do hereby declare the following description and accompanying drawings are sufficient to enable any person skilled in the art or science to which it most nearly apertains to make and use my said invention or improvements without further invention or experiment.

The nature of my invention and improvements consist in making phosphate of lime, by mixing the several ingredients hereinafter named, by the process hereinafter described.

To make my improved lime phosphate or fertilizer, I put seven hundred pounds of lime that is air-slaked, or slaked with just sufficient water to leave it dry and pulverulent or powder. Then add one hundred and eighty pounds of broken bones, and one hundred pounds of wood ashes, and mix the mass well together by stirring, and put the whole into a box or vat, and cover with from two to three inches of ground plaster, and add three hundred and twenty pounds of urine, more or less, portions of which may be poured on daily, and the composition allowed to remain until the bones are dissolved, which is usually done in from eight to twelve weeks. I then spread four hundred pounds of wheat bran on the barn-floor, or other platform, and put the composition before described upon it, and mix the whole thoroughly together, and let it remain twenty-four hours. Then add three hundred pounds of pulverized hen-dung, and mix it uniformly through the mass of composition, when it is ready for use.

The hen-dung may be readily pulverized in a common threshing-machine; and, if the composition is to be drilled with grain or small seed, it can also be pulverized by passing it through a threshing-machine. It is best to make this composition so that it will be ready about the time you wish to use it, or delay adding the bran and hen-dung until you wish to use it.

For wheat, corn, and rye, I use from two to four hundred pounds to the acre; for potatoes, from four to six hundred pounds to the acre, according to the quality and condition of the land. The proportions of the several ingredients named may be varied considerably, without materially affecting the result.

I claim the above-described composition or fertilizer, compounded in about the proportions specified, for the purpose of manuring land.

I also claim the process described of mixing and preparing said composition or fertilizer, substantially as described.

JACOB ALTHOUSE.

Witnesses:
J. DENNIS, Jr.,
WM. DENNIS.